(12) United States Patent
Angros

(10) Patent No.: US 11,333,587 B2
(45) Date of Patent: May 17, 2022

(54) ANALYTIC PLATES WITH MARKABLE PORTIONS AND METHODS OF USE

(71) Applicant: Lee H. Angros, Bethany, OK (US)

(72) Inventor: Lee H. Angros, Bethany, OK (US)

(*) Notice: Subject to any disclaimer, the term of this patent is extended or adjusted under 35 U.S.C. 154(b) by 0 days.

(21) Appl. No.: 16/688,807

(22) Filed: Nov. 19, 2019

(65) Prior Publication Data

US 2020/0088613 A1  Mar. 19, 2020

Related U.S. Application Data

(60) Continuation of application No. 14/533,953, filed on Nov. 5, 2014, now abandoned, which is a division of application No. 12/511,754, filed on Jul. 29, 2009, now abandoned, which is a continuation of application No. 11/895,544, filed on Aug. 24, 2007, now abandoned.

(60) Provisional application No. 60/840,407, filed on May 25, 2006.

(51) Int. Cl.
| | |
|---|---|
| *G01N 1/28* | (2006.01) |
| *G01N 1/30* | (2006.01) |
| *C09D 5/32* | (2006.01) |
| *B01L 3/00* | (2006.01) |

(52) U.S. Cl.
CPC ............... *G01N 1/30* (2013.01); *B01L 3/545* (2013.01); *C09D 5/32* (2013.01); *B01L 3/5082* (2013.01); *B01L 3/5453* (2013.01); *B01L 2300/0822* (2013.01)

(58) Field of Classification Search
CPC ............... B01L 9/52; B01L 2300/0822; G01N 35/00732; G01N 2035/00138; G01N 1/2813; G01N 2001/282; G01B 21/34
See application file for complete search history.

(56) References Cited

U.S. PATENT DOCUMENTS

| | | | |
|---|---|---|---|
| 3,481,659 A | 12/1969 | Rosenberg | |
| 3,482,898 A | 12/1969 | Van Den Bosch | |
| 3,579,540 A | 5/1971 | Ohlhausen | |
| 3,736,042 A | 5/1973 | Markovits et al. | |
| 3,834,823 A | 9/1974 | Seregely et al. | |
| 3,883,398 A | 5/1975 | Ono | |
| 3,928,142 A | 12/1975 | Smith | |

(Continued)

FOREIGN PATENT DOCUMENTS

| | | |
|---|---|---|
| DE | 3830721 | 3/1990 |
| DE | 19742775 | 4/1999 |

(Continued)

OTHER PUBLICATIONS

"Introducing Lab-Tek II—The Next Generation" Brochure, Nalge Nunc International, Naperville, IL. Aug. 3, 1996.

(Continued)

*Primary Examiner* — Jill A Warden
*Assistant Examiner* — Dwayne K Handy
(74) *Attorney, Agent, or Firm* — Dunlap Codding, P.C.

(57) ABSTRACT

An analytic plate or other substrate having a permanent etchable, laserable, and/or developable marking surface coating (referred to herein as an "etchable coating" or as a "developable coating") that is present on at least a portion of any side or surface thereof and is used to deposit a permanent indicium thereon, and a method of using the analytic plate or substrate.

14 Claims, 4 Drawing Sheets

(56) References Cited

U.S. PATENT DOCUMENTS

| | | | |
|---|---|---|---|
| 4,057,408 | A | 11/1977 | Pierson et al. |
| 4,087,154 | A | 5/1978 | Menzel |
| 4,447,140 | A | 5/1984 | Campbell |
| 4,481,246 | A | 11/1984 | Melisz et al. |
| 4,516,398 | A | 5/1985 | Wuchinich |
| 4,624,882 | A | 11/1986 | Melisz et al. |
| 4,679,914 | A | 7/1987 | Rosenberg |
| 4,705,705 | A | 11/1987 | Bross |
| 4,790,640 | A | 12/1988 | Nason |
| 4,867,628 | A | 9/1989 | Ammon et al. |
| 4,967,940 | A | 11/1990 | Blette et al. |
| 4,974,952 | A | 12/1990 | Focht |
| 5,030,551 | A | 7/1991 | Herren et al. |
| 5,089,315 | A | 2/1992 | Rosenberg |
| 5,111,344 | A | 5/1992 | Robinson, Jr. |
| 5,192,503 | A | 3/1993 | McGrath et al. |
| 5,348,989 | A | 9/1994 | Shiraishi |
| 5,443,791 | A | 8/1995 | Cathcart et al. |
| 5,485,527 | A | 1/1996 | Bacus et al. |
| 5,571,721 | A | 11/1996 | Turner |
| 5,598,295 | A | 1/1997 | Olofson |
| 5,683,786 | A | 11/1997 | Kavanaugh |
| 5,853,894 | A | 12/1998 | Brown |
| 5,948,685 | A | 9/1999 | Angros |
| 5,978,072 | A | 11/1999 | Nojima |
| 5,989,692 | A | 11/1999 | Brown |
| 6,033,738 | A | 3/2000 | Teranishi et al. |
| 6,037,168 | A | 3/2000 | Brown |
| 6,143,496 | A | 11/2000 | Brown et al. |
| 6,327,507 | B1 | 12/2001 | Buchan |
| 6,555,384 | B1 | 4/2003 | Angros |
| 6,615,763 | B2 | 9/2003 | Edwards |
| 6,723,290 | B1* | 4/2004 | Wardlaw ............ B01L 3/502738 422/559 |
| 6,745,067 | B1* | 6/2004 | Zavislan ............... A61B 5/0066 600/473 |
| 6,759,011 | B1 | 7/2004 | Richards et al. |
| 6,818,451 | B2 | 11/2004 | Angros |
| 6,855,490 | B2 | 2/2005 | Sompuram et al. |
| 6,991,214 | B2 | 1/2006 | Richter |
| 7,011,397 | B2 | 3/2006 | Miyazawa et al. |
| 7,595,874 | B1* | 9/2009 | Pelekhaty .......... G01N 21/6458 356/318 |
| 2002/0079297 | A1 | 6/2002 | Harrison |
| 2002/0182719 | A1 | 12/2002 | Jan et al. |
| 2003/0027342 | A1* | 2/2003 | Sheridan ................ G02B 21/34 436/43 |
| 2003/0194507 | A1* | 10/2003 | Secord .................... B41M 5/26 427/555 |
| 2003/0203591 | A1 | 10/2003 | Corbett |
| 2007/0187251 | A1 | 8/2007 | Ward |

FOREIGN PATENT DOCUMENTS

| | | |
|---|---|---|
| EP | 0443639 | 8/1991 |
| EP | 99905927 | 8/2004 |
| EP | 07837343 | 3/2010 |
| GB | 2227570 | 8/1990 |
| JP | 5062958 | 9/1994 |
| WO | 2007/050551 | 5/2007 |

OTHER PUBLICATIONS

Erie Scientific Brochure, Erie Scientific Company, Portsmouth, NH. (Applicant admits that this brochure was published at least one year prior to the filing of the present application submitted herewith).

"Adcell—The Next Generation in Printed Diagnostic Slides" Brochure, Erie Scientific Company, Portsmouth, NH. (Applicant admits that this brochure was published at least one year prior to the filing of the present application submitted herewith).

"Our Emphasis on Quality Comes from Knowing Our Work Goes Under a Microscope" Brochure, Erie Scientific Company, Porsmouth, NH. (Applicant admits that this brochure was published at least one year prior to the filing of the present application submitted herewith).

"Compatibility of Chamber Slide Components with Various Fixation Reagents", Tech Note, vol. 3, No. 20, Nalge Nunc International, Naperville, IL. (Applicant admits that this brochure was published at least one year prior to the filing of the present application submitted herewith).

"Compatibility of Various Mounting Media on Permanox Slides", Tech Note, Nunc, Inc., Naperville, IL. (Applicant admits that tis brochure was published at least one year prior to the filing of the present application submitted herewith).

"Incubation Chambers for Cell Analysis" Brochure, Lab Vision Corp, Fremont, CA. (Applicant admits that this brochure was published at least one year prior to the filing of the present application submitted herewith).

"The Next Generation! Lab-Tek II Chamber Slide System" Brochure, Nalge Nunc International, Naperville, IL. 1998.

"Unelko Corporation Material Safety Data Sheet", Unelko Corporation, Scottsdale, AZ, Jul. 1, 1992.

"United Chemical Technologies Information Brochure", United Chemical Technologies, Inc., 1996.

Sigmacote® Brochure, Sigma Chemical Company, P.O. Box 14508, St. Louis, MO 63178, 3 pages, Apr. 28, 1997.

Isolator™ Hydrophobic Marker from Shandon Lipshaw Catalog, one page, available at least one year prior to Aug. 6, 1999.

Kiyota™ Express—PAP PEN Brochure, Kiyota International, Inc. 1940 E. Devon Ave., Elk Grove Village, IL 60007, two pages, available at least one year prior to Aug. 6, 1999.

ImmEdge™ Pen Brochure, Vector Labs, Inc., vector@vectorlabs.com, two pages, available at least one year prior to Aug. 9, 1999.

Kiyota™ Liquid Blocker [Super PAP PEN], Kiyota International, Inc., 1940 E. Devon Ave., Elk Grove Village, IL 60007, two pages, available at least on year prior to Aug. 20, 2001.

Anonymous: "Antibody staining of adult head cryostat sections: (Aug. 29, 1996) PG/Zip lab", Internet Article, [Online] XP002291301, Retreived from the Internet: URL: http://qarrityi.mit.edu/internal/files/protocols/histology/adult%20head20Protocols/Mosaic%20Head%2024B10>[retrieved on Aug. 29, 1996].

Leica LMD6000, "Laser microdissection system", Retrieved from the Internet:URL:http://www.leica-microsystems.com [retrieved on Aug. 24, 2007].

Technology Start—P.A.L.M. Microlaser, "Technology Start", Retrieved from the Internet < URL://palm-microlaser.com > [retrieved on Aug. 24, 2007].

\* cited by examiner

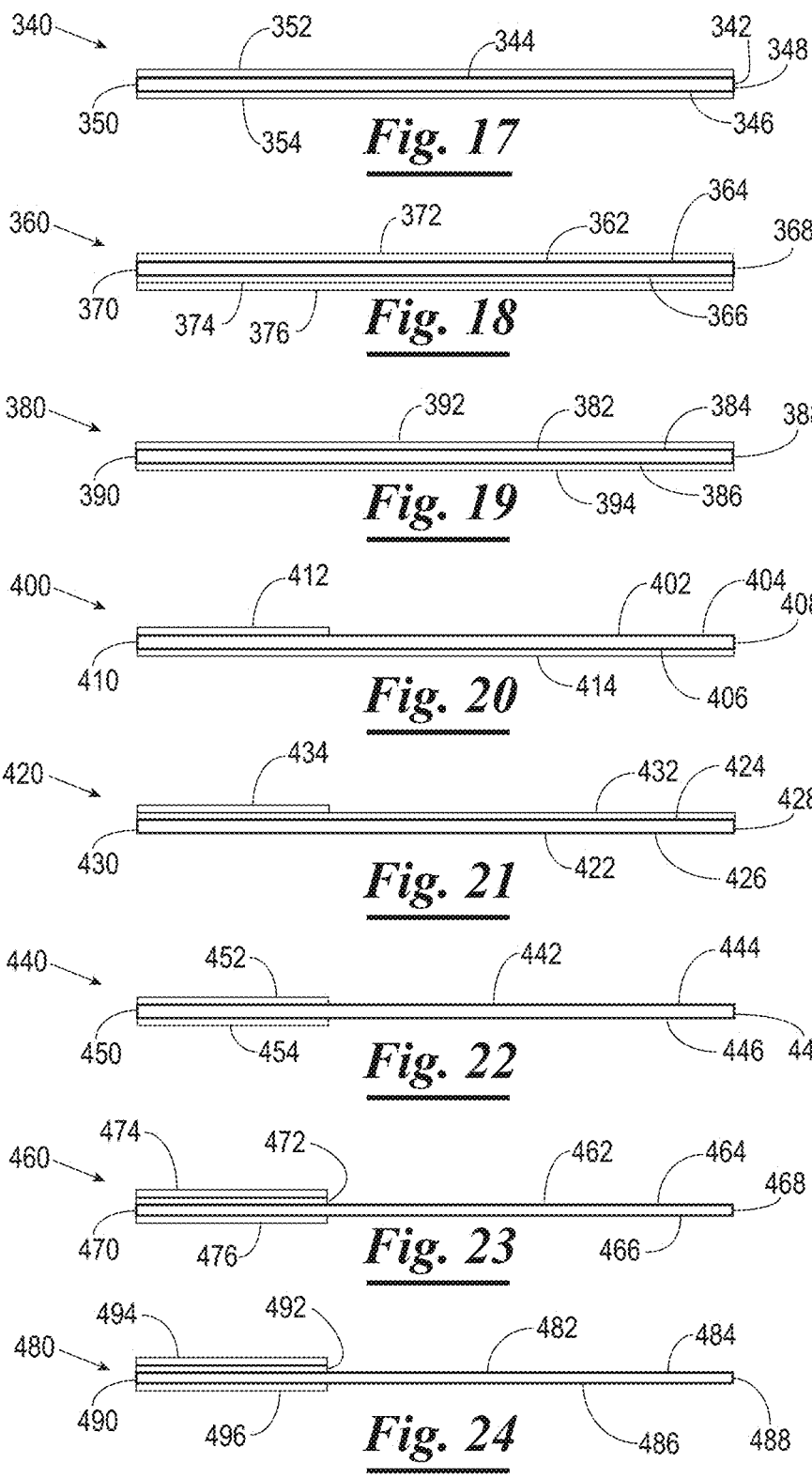

ANALYTIC PLATES WITH MARKABLE PORTIONS AND METHODS OF USE

CROSS-REFERENCE TO RELATED APPLICATIONS

This application is a continuation of U.S. Ser. No. 14/533,953, filed Nov. 5, 2014, which is a divisional of U.S. Ser. No. 12/511,754, filed Aug. 29, 2009; which is a continuation of U.S. Ser. No. 11/895,544, filed Aug. 24, 2007; which claims the benefit under 35 U.S.C. § 119(e) of U.S. Provisional Application Ser. No. 60/840,407, filed Aug. 25, 2006; the entirety of each being hereby expressly incorporated herein by reference.

BACKGROUND

In medical and scientific laboratories, it is common to have analytic plates for microscopy and testing methodologies. A microscope slide is an analytic plate that can have a portion on at least one side or end of a slide for applying unique or non-unique identification markings (indicia) thereon. These indicia can be symbols, numbers, codes, bar codes, 2-D codes, and any other visually readable and or machine readable symbols or characters known in the art. These indicia are used to identify the slide for a particular specimen, patient, laboratory test, or to identify specific areas on the slide for placement of biological specimen(s). Early prior art microscope slides featured frosted and/or ground translucent matted areas on either portions of the top surface and/or bottom surface of the microscope slide (e.g., as described in U.S. Pat. Nos. 3,481,659, 4,087,154 and 4,679,914). These chemically-frosted or machine-matted translucent areas could be used for hand writing markings with a pencil or laboratory ink pen. Writing on a frosted portion of a slide is preferred to just writing on the smooth glass alone due to the advantage of a roughened surface for adhesion of the pencil lead or ink. More recent advances in marking surfaces feature slides with areas having opaque epoxy coatings, as described, for example in U.S. Pat. Nos. 4,679,914, 4,481,246, 4,624,882, 5,989,692, 5,111,344, and 5,089,315. These marking areas formed with the opaque epoxy coatings may feature colors, matte finish, micro texture properties, and better porosity characteristics allowing the inks in the laboratory pens to "soak into" the opaque epoxy coatings to improve adhesion of laboratory ink pens and pencil lead. These opaque epoxy coatings are manufactured for example by Erie Scientific Company, Portsmouth, N.H., and sold under the trade names SuperFrost® and ColorFrost®. Laboratories today have mechanized mechanical stylus etching instruments and or automated laser etching instruments that can abrade or remove portions of the opaque epoxy coating to impart indicia thereon by exposing the bare glass underneath the coating. Laser etching instruments are known, such as those described in U.S. Pat. Nos. 5,919,553 and 5,683,786, each of which is hereby expressly incorporated herein by reference in its entirety. Hand etching, hand scribing, mechanized etching or scribing, and laser etching which are known and used today in the laboratory setting remove only a portion of the epoxy coated area producing a permanent indicium that is visualized by seeing the clear glass underneath the epoxy coating that has been removed. A recent advance to this technology of removing some of the opaque coating and making the clear glass markings more visible is described in U.S. Pat. No. 5,598,295, which contemplates providing a contrasting color coating on the lower surface of the microscope slide below the etched opaque epoxy coating. The colored coating on the lower surface can be seen through the upper etched portion as a contrasting color to further enhance the visualization of the indicium resulting from the etched portion of the topside epoxy coating etched away. These slides are manufactured for example by Erie Scientific Company, Portsmouth N.H., and sold under the trade name ColorMark®.

Such slides having epoxy opaque coatings are useful for routine processing when the coated surface is to be totally immersed in processing chemicals and staining baths. However, if the slide is used in a horizontal position for application of aqueous and non-aqueous liquids or liquid samples, the liquid sample often simply flows over the opaque epoxy coatings thereby resulting in a loss of liquid and/or sample applied to the slide. Coatings in the slides shown in U.S. Pat. Nos. 4,481,246 and 4,624,882 have a raised surface of 0.0003 inches to 0.0008 inches. These heights have a very limited mechanical liquid barrier effect and do not prevent movement of the liquid over the slide. Moreover, many modern laboratory reagents contain detergents and surfactants like Brij® and Tween®, for example, to reduce hydrogen bonding of the liquid reagent. The slightly elevated mechanical barrier of the prior art opaque coating slides are completely ineffective from stopping these liquids from passing or migrating thereover with these additives present. Further, these mechanical barriers are completely ineffective in repelling processing liquid chemicals like alcohols, acetone, xylene, polar and non-polar solvents, lipid containing liquids, volatile and non-volatile oils, and mineral oils.

As is evident, there is a need for a chemically resistant coating for providing indicia on a substrate such as an analytic plate, such as a microscope slide, wherein the coating used to make the indicia can still substantially repel aqueous, non-aqueous, hydrophobic, lipophobic, processing liquids, other liquids, and biological liquids, and wherein the coating can be etched or developed by various means to produce the indicia on the analytic plate thereon.

All U.S. Patents, and Published U.S. Applications cited anywhere herein are hereby expressly incorporated by reference herein in their entireties.

BRIEF DESCRIPTION OF THE DRAWINGS

FIG. 17 is a side view of an analytic plate having first and second coatings thereon in accordance with an alternate embodiment of the invention.

FIG. 18 is a side view of an analytic plate having a first, second, and third coating thereon in accordance with an alternate embodiment of the invention.

FIG. 19 is a side view of an analytic plate having first and second coatings thereon in accordance with an alternate embodiment of the invention.

FIG. 20 is a side view of an analytic plate having first and second coatings thereon in accordance with an alternate embodiment of the invention.

FIG. 21 is a side view of an analytic plate having first and second coatings thereon in accordance with an alternate embodiment of the invention.

FIG. 22 is a side view of an analytic plate having first and second coatings thereon in accordance with an alternate embodiment of the invention.

FIG. 23 is a side view of an analytic plate having a first, second, and third coating thereon in accordance with an alternate embodiment of the invention.

FIG. 24 is a side view of an analytic plate having a first, second, and third coating thereon in accordance with an alternate embodiment of the invention.

DETAILED DESCRIPTION OF THE INVENTION

Figure 1:
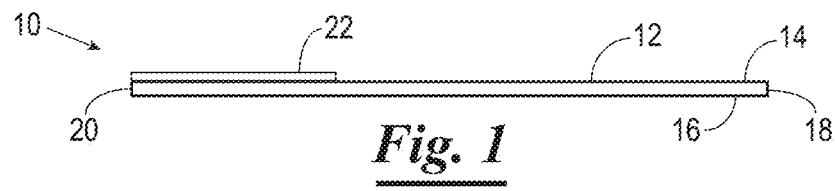
FIG. 1 is a side view of an analytic plate having a coating thereon in accordance with an embodiment of the present invention.

The present invention contemplates an analytic plate or other substrate having a permanent etchable, laserable, and/or developable marking surface coating (referred to herein as an "etchable coating" or as a "developable coating") that is present on at least a portion of any side or surface thereof and is used to deposit a permanent indicium thereon. Where used herein the term "analytic plate" refers to any object having a markable surface, including any biological processing consumable product. The coating preferably imparts containment (repellant) properties to the plate for containing liquids disposed thereon in discrete areas thereon, such as aqueous, non-aqueous, hydrophobic, lipophobic, processing liquid or any other type of organic, non-organic, or biological liquid. Such coatings generally referred to herein as "hydrophobic coatings" and which have these liquid containment (repellant) properties may comprise Teflon®, silicones, silanes, siloxanes, fluorosilanes, fluoropolymers, liquid repellent polymers, and combinations thereof present in a laboratory solvent resistant coating base comprising epoxies, acrylics, fluropolymers, elastomers, or other types of coating bases know in the art of coatings. Other coatings having such liquid containment (repellant) properties based inks or coatings that are either opaque (e.g., such as shown in U.S. Pat. Nos. 6,767,587, 6,663,941, 6,495,624, 6,447,919, 6,362,246, 6,265,015, 6,156,389, 6,143,496, 5,989,692, and 5,853,894), transparent (e.g., 3M Scotchcal® and Scotchlite® and those produced by Kiwo, Inc. 1929 Marvin Circle, Seabrook, Tex. 77586), translucent, or invisible are known and are contemplated. Transparent liquid containment coatings can be comprised of silicones, silanes, siloxanes, flurosilanes fluropolomers dissolved in volatile and non-volatile solvents like alcohols, acetone, flurosolvents, MEK, and aqueous suspensions. Indicia (markings) can be unique or non-unique symbols, numbers, codes, pattern(s), bar codes, 2-D codes, lines, holographic image, iridescent image and any other visually readable and or machine readable symbols or characters known in the art. Examples of barcodes contemplated for use in the present invention include but are not limited to symbologies having square, rectangular, circular, or irregular shapes and more specifically may include symbologies known as EAN-13, EAN-8, EAN-128, UPC-A, UPC-E, Code 11, Code 39, Code 93, Code 25, Code 128, Codabar, MSI, Jan 13, Jan 8, Plessey, Telepan, Interleaved 2 of 5, Discrete 2 of 5, 2-dimensional and RSS barcodes including Data Matrix, PDF417, Maxicode, Aztec Code, QR code, Micro PDF417, Samsung PDF417, Data Code, Code 49, 16K, RSS14, RSS limited, RSS Expanded, 2D Pharma Code, Glaxo Smith Kline, HIBC, IKS, IMH, Kurandt, Novartis Pharma, Pharma Code, and PZN.

The coatings contemplated herein may be etched or developed for example to produce indicia by methods including, but not limited to, heat, laser, $CO_2$ lasers, ultraviolet, UV light, infrared, various visible and non-visible wavelengths of light, high and low intensity light sources, and other laser emitting source's know in the art of lasers. For example, a cost effective type of laser, which can be used with or in the present invention is a $CO_2$ laser or any other laser known in the art of lasers to produce a focused laser beam onto a substrate in the nanometer range of from less than 1 nanometer to greater than 11000 nanometers, preferable in the range of 200-1500 nanometers. Other types of laser are solid-state lasers, gas lasers, excimer lasers, dye lasers, and semiconductor lasers, sometimes known as diode lasers. Semiconductor lasers are generally very small, use low power, and are associated with laser printers and CD players. Methods of scanning are known in the art like Raster-scanning infrared laser beam emitting $CO_2$ laser that raster-scans in the Y-axis can be used for developing the developable coating. Scanning the laser beam through the use of two galvanometers (so-called X/Y scanning) and a flat field focusing lens, as well as continuous sweeping and on or off axis straight line laser marking methods are known and contemplated for use herein. A laser instrument which can be used in laser marking the opaque epoxy coatings used in the present invention as used in the laboratory setting is the Thermo Fisher Scientific Laser MicroWriter™ (e.g., catalog number B35300014) commercially available from Thermo Fisher Scientific Corp., 81 Wyman Street Waltham, Mass. 02454. Other commercial sources of laser instruments are known and contemplated for use herein such as instruments from Hamar Laser Instruments, Inc., 5 Ye Olde Road Danbury, Conn. 06810 USA, Evergreen Laser Corporation, 9G Commerce Circle, Durham, Conn. 06422, and Universal Laser Systems, Inc. 16008 North 81st Street Scottsdale, Ariz. 85260.

The present invention in one embodiment contemplates a developable (i.e., photosensitive or heat sensitive) coating (e.g., comprising a material such as shown in U.S. Pat. Nos. 2,824,114, 3,051,593, 4,654,290, 4,769,310, 4,797,871, 4,323,755, 4,775,786, 2,515,936, 3,208,860, 3,540,793, 4,017,318, 4,175,071, 4,217,409, 4,237,212, 4,297,417, 4,861,620, 4,392,141, 4,106,939, 4,401,992, and 5,030,551) present on at least a portion of any side of an analytic plate, substrate or biological processing consumable product for developing, changing color, changing contrast or otherwise producing visually, mechanically, optically, and machine readable contrasting indicia on or in the developable coating without requiring etching or otherwise removing portions of the coating to impart the indicia thereon whether or not the coating imparts liquid containment (repellant) properties to the substrate.

The substrate contemplated herein can be test tubes, plastic or glass microscope slides, glass plates, glass cover slips, petri-dishes, plastic cover slips, cover glass, analytic plates, ceramic plates, micro-titer plates, biochips, vials, and any other biologically associated container or substrate for processing biological specimens that require uniquely and non-uniquely identifiable indicia thereon.

The preferred substrate used herein is a standard glass microscope slide. The coating on which the indicium can be marked can be hydrophobic as explained herein to form a liquid containment border to prevent the migration of the liquid from flowing from the sample area to the marking area. A preferred embodiment is an etchable opaque hydrophobic coating on which ink poorly adheres although pencil lead has moderate but limited adhesion thereon. Thus, the opaque hydrophobic coating will not allow inks from standard lab writing pens to adhere thereto. The opaque hydrophobic coating is preferably present only on a marginal portion of a surface of the slide and is preferably continuous therefrom one edge of the slide to the opposite edge of the slide thereby producing a continuous liquid border. The preferred way to produce indicia on the etchable opaque hydrophobic coating as contemplated herein is to remove only a portion of the opaque hydrophobic coating to expose the clear glass below. The partially removed areas of the opaque coating form an indicium which can be used to uniquely or non-uniquely identify the substrate. In a preferred embodiment, at least a portion of the opaque hydrophobic coating extends completely from one edge of the plate to an opposite edge thus forming a liquid border across a portion of the substrate. Even when portions of the opaque coating are removed to form the indicium, some of the opaque hydrophobic coating will be present on the substrate to form the border extending from one edge to the opposite edge thereby forming a liquid containment (repellant) border to contain liquids on the microscope slide from passing over the opaque coating. For example, when the liquid on the substrate comes in contact with the hydrophobic opaque coating, the liquid is repelled and does not migrate or flow over the coating. The hydrophobic opaque coating can be partially removed to form the indicium by instruments known in the art as mentioned previously. The preferred method is etching and/or laser ablation.

In an alternate embodiment, underneath the hydrophobic opaque coating there is a "developable coating" (also referred to herein as an "activatable coating") comprising a photosensitive material which when exposed to light is "developed" (activated), or altered to have a different color. When the hydrophobic opaque coating above is removed by a laser or other means, a portion of the photosensitive material of the developable coating is exposed. The now exposed photo sensitive material becomes activated or developed by the laser light (or other light) and becomes darker or another color. This embodiment is advantageous because the contrasting color or image causes the etched portion of the opaque hydrophobic coating to become more distinct and therefore more visible. There are also commercially available coating materials that are transparent or translucent and yet upon photoactivation become dark, such as, but not limited to titanium isopropylate, titanium dioxide, titanium, tin, cerium and antimony.

The developable coatings can be fluorescible once activated by laser light and used to mark an area on a slide that can be viewed under UV or fluorescent light microscopes are known and contemplated like Alexa series 405, 407, 430, 488, 633, 647, 660, and 610-PE, APC, CY-series 5, 5.5, and 7. Examples of fluorescible dyes and stains include, but are not limited to Rhodamine, Texas Red, Fluorecein, DAPI, PI, Sectrum aqua, orange, green, yellow, gold, red, and blue, sytox green, thiazole orange, and resazurin.

The photosensitive layer (developable coating) and opaque hydrophobic coating or hydrophobic coating can be $1\times10^{-10}$, $1\times10^{-9}$, $1\times10^{-8}$, $1\times10^{-7}$, $1\times10^{-6}$, $1\times10^{-5}$, $1\times10^{-4}$, $1\times10^{-3}$, $1\times10^{-2}$ inches in thickness, for example. These thicknesses can alternately represent both the opaque coating and the developable coating together, or individually.

The analytic plates described herein would be advantageously used with automated immunohistochemical instruments such as the Ventana® Benchmark® LT and XT stainers, Biogenex® Optimax® stainer, and Dako® Autostainer for example. These stainers have a problem with keeping the processing liquids within a discrete area on the slide due to the "wicking effect" of the processing liquid chemicals. The Ventana instruments reduce this "wicking effect" by placing a raised hydrophobic bar code labeled sticker on one end of the microscope slide. The sticker produces a physical barrier to reduce the liquid from flowing over the slide. This technique is cumbersome, requiring the production of a bar code label as well as the attachment of it to the slide thus covering up the marking surface portion of the slide. The technicians who use this method cannot take advantage of automated slide marking instruments that directly label slides which have a coated marking surface as discussed above. If the technician used the prior art method of removing portions of the coated marking surface by etching or laser removal, the coating isn't hydrophobic or lipophobic and the liquid reagent would simply run off the slide.

The markable coating of the present invention, which as noted above has liquid repellent properties, could be used with the etching or laser removing labeling machines available commercially to place identification markings on the novel coated slides of the present invention and be able to directly go to immuno-staining apparatuses, such as the Ventana® stainer noted above, without the necessity of placing a label or sticker thereon to contain the liquid on the sample area of the slide. Thus the present invention eliminates the step of applying a sticker or label to produce a liquid containment border, and also eliminates the covering up any identification marking already present on the slide which sometimes occurs when using a sticker or label. The proprietary bar code for use on the commercially available instruments instead can be directly automatically etched into the opaque hydrophobic coating of the present invention by commercially available marking and etching instruments thus producing a ready to use permanently labeled slide having a liquid containment border thereon, usable on processing instruments, without the need for the application of a liquid border sticker or label. A further advantage of the analytic plates of the present invention when used with the Ventana® staining instruments is that the oil evaporation prevention layer which is generally used in that system, which is a mixture of an oil and a surfactant, is repelled by the hydrophobic coating on the slide of the present invention. Therefore there is no necessity for air knife system of the Ventana apparatus to blow away residual oil from the "bar code portion" to reduce the wicking effect of the oil as is required when a slide with a prior art sticker or label is used. The analytic plate of the present invention with the hydrophobic coating can repel the oil and the aqueous layer on the microscope slide entirely by itself, without the need for an air knife or a raised hydrophobic label. Thus a very efficient and reliable aqueous layer and liquid repellant border is maintained during the automated staining protocol.

In an alternate embodiment of the present invention, the markable coating on the substrate is an opaque, transparent, translucent, or invisible developable coating which contains at least one photoactivable agent or pigment that can darken or become opaque, change color, develop, expose, change molecularly, fluoresce, or otherwise become visually different in contrast to the rest of the dependable coating when activated by laser light or any other type of effective electromagnetic radiation. Before activation from the laser light (or other electromagnetic radiation) the developable coating is present on the substrate (e.g., microscope slide) but is opaque, transparent, translucent, or invisible. When the laser light contacts the developable coating, the areas of the developable coating which are contacted by the laser light are activated, developed, and or exposed and darken or become opaque, change color, or become contrastingly visible to the eye as noted above. Only the light activated areas of the developable coating are darkened, turned opaque, develop, or visually change in contrast in relationship to the non-activated or non-developed parts of the developable coating. Where used herein, the developable coating is also referred to as a "photoactive coating." These types of light activated agents are commercially available as discussed previously. The photoactivation of the developable coating can be caused by methods mentioned above to activate the photoagent present. The opaque, transparent, translucent, and or invisible developable coatings of the present invention retain their hydrophobic or liquid repellant properties even if the exposed or developed "dark areas" retain or don't retain their hydrophobic or liquid repellant properties after laser light development by or exposure to the activation light.

In an alternate embodiment of the present invention, the hydrophobic developable coating on the substrate comprises a heat activated agent for converting portions of the coating to a visually different color, intensity or contrast that can be activated or developed by a heat source.

The hydrophobic coatings contemplated herein for producing indicia can be opaque, opaque with color, transparent, translucent, or invisible. The coatings can be treated by mechanical etching, laser etching, laser light, other types of electromagnetic radiation, and/or heat printing devices to render the coating with indicia (visible identification markings) for labeling of an analytic plate like a microscope slide or other substrate using in the laboratory sciences or technologies as discussed elsewhere herein. The indicia rendered herein can be black, colored, visible through the coating (e.g., etched), or even different shades of color in contrast to the basic coating whether the basic coating is transparent, translucent, opaque, transparent and colored, translucent and colored, or opaque and colored. In one example, the developable coating may be light blue (or other color) before activation, and after activation, the identification markings (indicia) become either black or a darker shade of blue (or darker other color), to become visibly distinct and thus readable by the naked eye or by a machine readable instrument.

The etchable or developable coating can be opaque and colored. The etchable or developable coating may contain an ink with pigment, with or without texture additives. The developable coating may have other activators therein to change the visually perception by prior mentioned devices and methods, preferably including laser activated pigments, compounds, and elements like mercury, cobalt, iron, copper, nickel, lead, and vanadium. Automation is also contemplated for the etching, developing, or activation of indicia on or in the coating. These inks or coatings can be screen printed, roll coated, bar coated, spray coated, pad printed, or applied anyway known in the art of applying coatings to substrates made of glass, plastic, or ceramic. The coating can be cured by UV, heat, air, and other known ways of curing ink coatings.

In one alternate embodiment, the present invention comprises a microscope slide having an upper surface and a lower surface. The upper surface is for the placement of a biological specimen. The upper surface preferably has a first transparent, translucent, or invisible hydrophobic for example as described in U.S. Pat. Nos. 5,948,685, 6,372,507, and 6,818,451 (each of which is hereby expressly incorporated herein by reference). The first coating is normally located in a marginal (e.g., leftward) area of the slide. The upper surface can have other liquid containment borders present on its surface as described in the above mention patents. In direct contrast to the upper surfaces of the slides of the prior art, the upper surface of this embodiment of the present invention does not have an opaque coating thereon. The lower surface of the slide comprises a second transparent, translucent, or invisible developable coating adherent to the glass surface directly underneath or adjacent the first coating on the upper surface of the slide, the first coating (on the upper surface) is of a size and area typical of a prior art epoxy coated marking area (e.g., about 2.5 cm×2.5 cm), the lower surface also comprises an opaque third coating disposed over the transparent, translucent, or invisible coating on said lower surface. The transparent, translucent, or invisible second coating on the lower surface is a developable coating able to be developed or otherwise turn a contrasting color or black when exposed with a laser or other means as described elsewhere herein. Only the area the laser comes in contact with is developed producing a dark or otherwise contrasting color or blackened indicium. The opaque third layer disposed over the laser developed coating on the lower surface serves as a contrasting color to the developed layer when viewed through the upper surface of the slide. The opaque third coating on the lower surface can be of any type of the known prior art opaque epoxy coatings for example.

The opaque third coating can be white or have any color know in the prior art epoxy coated microscope slides or other colors. The upper surface first coating can be transparent or translucent with color or invisible, as long as it is liquid repellant. The activatable layer on the lower surface is a developable coating as described above. This embodiment thus features a transparent, translucent, or invisible developable second coating overlaid with an opaque epoxy third coating or coating which is transparent or translucent with color. The laser develops the transparent, translucent, or invisible second coating by passing through the upper surface of the slide, i.e., through the glass, thereby developing the second coating thereunder. Machine readable symbols underneath the slide can be read through the upper surface of the slide because the lowermost opaque or transparent or translucent with color layer below the developable second layer gives a contrasting background when viewed or scanned through the upper surface of the slide.

In an alternate embodiment, a portion of the upper surface of the substrate (e.g., microscope slide) can be coated with a colored transparent developable coating that is developable by a laser or other means. A hydrophobic coating such as described in U.S. Pat. Nos. 5,948,685, 6,372,507, or 6,818,451 can be placed as an overcoat directly on top of the colored transparent developable coating. The laser passes through the uppermost transparent hydrophobic coating and develops an indicium in the colored transparent developable coating underneath.

Other novel embodiments relating to transparent, translucent or invisible coatings which are not hydrophobic that can be developed are contemplated. For example, a standard microscope slide, analytic plate, glass cover slip, and plastic cover slip can be completely coated or at least partially coated on the lower surface with a transparent or invisible developable coating. Examples of these substrates are known herein as "plates." In a preferred embodiment, the lower surface of the "substrate" is completely or substantially coated from one end to the other with a transparent, translucent or invisible developable coating thereon. This developable coating can then be developed, by methods described above, to cause an indicium to be formed in the developable coating on the lower surface of the substrate by passing a laser beam from the upper surface of the substrate through the substrate thereby developing the indicium in the developable coating on the lower surface. In one embodiment the user could mark an area permanently onto the lower surface of the substrate to indicate an area of interest. For example, the user could view the stained biological specimen through a monitor and could choose an area of interest on the slide relating to the biological specimen, and could mark or "indicate" that particular area by passing a laser beam over the desired area to develop an indicium to indicate one or more positions of areas of interest on the slide. Such laser micro-dissection is well known in the art of histology. The present embodiment modifies this technique by marking or developing or pointing to the areas removed by the micro-dissections. Once the micro-dissections are complete, in the prior art, there is plain glass around the "dissected" specimen. However, with the present novel embodiment, the once plain glass is now developed, e.g., indicated by a visible color, and the user can thus see the specific area of dissection. The indicia thus marked could be seen with the naked eye and also easily identified under the microscope.

Laser microdissection, laser capture microdissection (LCM), and laser microdissection and pressure catapulting (LMPC) are used in medical and research laboratories to collect specific biological specimens, specific types of tissue, and biological cells. These methods cut out or separate portions of biological specimens. The intent is to separate portions of the biological specimens by dissecting them using a laser. This technology is known and described in U.S. Pat. No. 6,512,576, which is hereby expressly incorporated herein by reference in its entirety. Laser capture microdissection typically is used on biological tissues, smears, thin-preps, cytospins, referred to elsewhere herein as "biological samples." The laser microdissection instrument uses a laser to "cut-out" sections or "portions" of the biological sample to isolate these "sections" or "portions" for analysis. Which are referred to herein as "dissected portion(s)." The dissected portion(s) are then transferred to a thermoplastic film(s) or micro-vial(s). Types of laser microdissection instruments that are known and used are the Leica LMD6000 manufactured by Leica Microsystems GmbH Ernst-Leitz-Strasse 17-37 35578 Wetzlar and the P.A.L.M. Microlaser manufactured by P.A.L.M. Microlaser Technologies GmbH Am Neuland 9+12 82347 Bernried, Germany sold by Carl Zeiss Microimaging GmbH. For example, the laser used can be a carbon dioxide laser having an intensity of less than about 50 milliwatts (mW) to about 100 watts and a pulse duration between less than 1 to 1000 milliseconds (mS). The laser can also be an AlGaAs laser diode. The laser diode can run in a mode of $TEM_{oo}$, other intensities are known and used. The present invention comprises a transparent or invisible developable coating on a substrate that can develop an indicium where the "dissected portion(s)" were removed. Before the present invention, the "dissected portion(s)" would only uncover the glass below. It would be difficult to locate on the slide directly where the "dissected portion(s)" are missing. In the present invention a portion of the transparent or invisible developable coating would be developed (e.g., darkened or colored), by the microdissection laser, and thereby permanently mark the exact location or area that the "dissected portion(s)" occupied during or prior to microdissection. Therefore a permanent record of the "dissected portion(s)" would be marked on the microscope slide for archival purposes. The developed area can be just an outline of the "dissected portion(s)" or the total surface area of the "dissected portion(s)", depending on the program selected from the type of laser microdissection instruments described. The developed area can be seen visually by the naked eye or under a microscope to easily identify the blank areas left after removal of the "dissected portion(s)." This method would be advantageous when microdissecting a biological specimen that has open spaces between cells or group of cells intended for microdissection. Once the "dissected portion(s)" are removed the developed area would completely and specifically identify the original locations of the "dissected portion(s)" prior to microdissection, therefore eliminating not knowing where the "dissected portion(s)" were located originally before microdissection.

In a further embodiment, the entire lower and/or upper surfaces of a substrate such as a glass or plastic cover slip are coated with a transparent or invisible developable coating. After the cover slip is attached to the microscope slide over the sample, the transparent or invisible developable layer can be developed to mark or indicate positions relating to the slide or the biological specimen. In the prior art methods, a person would mark the areas of interest with an ink pen, felt tip marker, or other ink devices. These prior are ink markings are exposed on the upper surface of the cover slip and can become removed with handling; the ink may become brittle, and or fade over time resulting in the loss of the markings. The present invention is developed to form permanent indicia on the cover slip either on the upper surface and/or lower surface of the coverslip, or on the upper or lower surface of the slide beneath the coverslip. The indicium, when developed on the upper or lower surface of the coverslip is further protected by being sealed against the upper surface of the microscope slide with a mounting media.

This embodiment can be used for example with the coverslip as disclosed in U.S. Published Application 20070092408 (expressly incorporated by reference herein), which has unique and non-unique indicia thereon. The transparent developable coating could be on the lower surface of the cover slip, and a dry film adhesive applied over the developable coating. When the cover slip is affixed to the slide and is dried, an indicium can now be marked or developed in the developable coating on the undersurface of the coverslip with a laser or other means. The indicia can be a line, number, pattern, drawing, dot, barcode, 2-D code, or machine readable symbol or character, for example which uniquely or non-uniquely identifies the microscope slide or biological specimen thereon. The biological specimen can also be marked or identified with the markings on the cover slip by a laser as described in U.S. Published Application 20070092408, which describes a method of producing coverslips which could be modified in accordance with the novel coverslip described herein. Examples of adhesives that can be used herein are described in U.S. Published Application 20070092408.

In one method of construction, raw panes of glass from which coverslips are cut can be coated on one surface with the transparent or invisible developable coating of the present invention and then the dry film adhesive could be applied directly over the developable coating. Individual cover slips could then have their unique or non-unique indicia developed by a laser from the upper or lower surfaces of the panes of glass before each cover slip is separately cut from the glass pane. Mass production of individual cover slips with or without dry film adhesive present on one side could be produced with unique or non-unique indicia effectively and efficiently all on the raw panes of glass before production of each individual coverslip.

Further embodiments of developable marking coatings that do not have hydrophobic or liquid repellent properties are also contemplated herein. The non-hydrophobic developable coating can be mixed with the opaque epoxy coatings such as known in the prior art or with a transparent or translucent colored coating and placed on the upper surface of a microscope slide. Or, the developable coating could be mixed with the molten glass during production of the glass either before or during the floating process or production of the glass, wherein the entire microscope slide can be developed at any location thereon. In this embodiment, the slide could have a contrasting color coating anywhere on the slide that is required to enhance visualization of the developed area, preferably on the lower surface. The transparent/invisible developable coating could be laminated between two panes of glass and annealed to have a thickness of a regular microscope slide. This embodiment as well could have a contrasting color coating anywhere on the slide that is required to enhance visualization of the developed area, preferably on the lower surface.

The embodiments of the present invention can be utilized with the devices of U.S. Published Applications 20060233943 and 20060231023 (each of which is hereby expressly incorporated herein by reference) wherein a coating apparatus is disclosed which coats a microscope slide or plate with different types of coatings. In these applications one could coat an ordinary microscope slide with (1) the developable marking coatings contemplated herein, (2) a positive charged coating, and (3) a liquid containment (hydrophobic) border, all in one automated apparatus. When the slide is complete with its several coatings thereon, it could be transferred to a laser marking apparatus for developing as described herein. For example, the laser apparatus could be attached or incorporated with the apparatus described above in the '943 and '023 publications to develop the developable coating with unique or non-unique indicia.

An alternative method of the present invention comprises printing a marking on a coating on a microscope slide is contemplated. The printable coating can be of any type known in the art which includes but isn't limited to U.S. Pat. Nos. 5,989,692, 4,481,246, 4,679,914, 4,624,882, 5,089,315. Other known printable coating resins are known and describe and can absorb or otherwise have adherent onto the coating a marking of a combination of plastics and pigments fused by heat and pressure are contemplated.

The method contemplated utilizes a light beam from a semiconductor laser ([or other laser source, either high or low intensity) controlling the placement of electric charges on a photoconductor surface. The photoconductor is of a material that only conducts electricity when exposed to light. The electric charges can move through the photoconductor only when the laser beam hits it. The apparatus contemplated uses a corona discharge to place charges on a darkened photoconductor; the laser beam then removes charges from certain places on the photoconductor. The end result is a pattern of electric charges that is the image of the final marking. Toner particles, known in the prior art, which are made from plastics and pigments, like styrene acrylate copolymer, iron oxide (CAS 1317-61-9), carbon black (CAS 1333-86-4), amorphous silica (CAS 7631-86-9), and titanium dioxide (CAS 13463-67-7) in various combinations and percentage amounts are given an electric charge so that the toner particles cling to the charge image on the photoconductor. This pattern of toner particles are then transferred to the coating on the microscope slide electrostatically and are fused to the coating on the microscope slide with heat and pressure. This process is well known in the art of laser printers printing on paper. This method differs from mentioned above that contemplate using a laser to directly develop a coating already present on the microscope slide, however it would be apparent from the previously mentioned descriptions of developable transparent, opaque or invisible coatings present on a microscope slide can utilize the above compounds in the developable coatings. Percentages of compounds present can be of any known in the art for example, styrene acrylate copolymer less than 5% to greater than 90% (30%-60% preferred), Iron oxide less than 5% to greater than 90% (20%-70% preferred), carbon black less than 5% to greater than 80% (0.01%-25% preferred), titanium dioxide less than 5% to greater than 90% (0.001%-25% preferred). Other pigments, plastics, resins, and dyes are known and can be used in the developable and or printable coatings of the present invention are described in U.S. Pat. No. 6,432,601 5,278,020, 4,983, 488, 4,362,801, and 4,352,877.

Turning now to the drawings, various embodiments of the invention contemplated herein are shown therein. The embodiments described below can be used in the various manners disclosed above.

FIG. 1 shows a coated analytic plate 10 which is constructed of a substrate 12 having an upper surface 14, a lower surface 16, a right end 18, and a left end 20, and an etchable hydrophobic coating 22 disposed on the upper surface 14 of the substrate 12 near the left end 20 thereof. The etchable hydrophobic coating 22 has liquid repellent properties as described elsewhere herein and may be comprised for example of an opaque heat cured epoxy resin having liquid repellent constituents.

Figure 2:
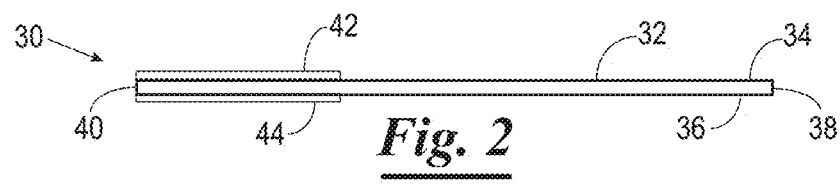
FIG. 2 is a side view of an analytic plate having first and second coatings thereon in accordance with an alternate embodiment of the invention.

FIG. 2 shows a coated analytic plate 30 which is constructed of a substrate 32 having an upper surface 34, a lower surface 36, a right end 38, and a left end 40, and an etchable hydrophobic first coating 42 disposed on the upper surface 34 of the substrate 32 near the left end 40 thereof, and an opaque second coating 44 disposed on the lower surface 36 of the substrate 32 near the left end 40 thereof and beneath the first coating 42. First coating 42 is preferably constructed of an etchable opaque material having hydrophobic properties, wherein when an indicium is etched in the first coating 42, the substrate 32 is revealed and the opaque second coating 44 is visible therethrough.

Figure 3:
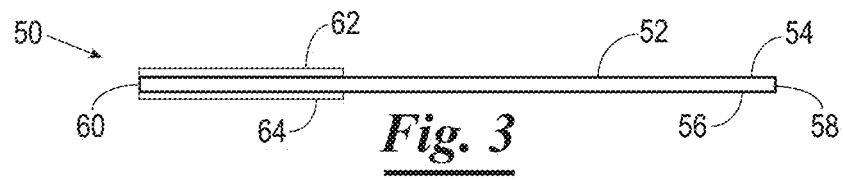
FIG. 3 is a side view of an analytic plate having first and second coatings thereon in accordance with an alternate embodiment of the invention.

FIG. 3 shows a coated analytic plate 50 which is constructed of a substrate 52 having an upper surface 54, a lower surface 56, a right end 58, and a left end 60, and an etchable hydrophobic first coating 62 disposed on the upper surface 54 of the substrate 52 near the left end 60 thereof and a colored transparent or translucent second coating 64 disposed on the lower surface 56 of the substrate 52 near the left end 60 thereof and below the first coating 62. The analytic plate 50 is similar to analytic plate 30 except the second coating 64 is colored and transparent or translucent rather than opaque.

Figure 4:
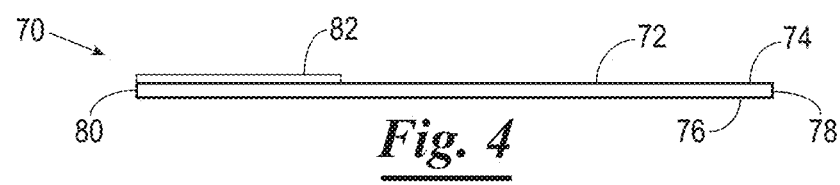
FIG. 4 is a side view of an analytic plate having a coating thereon in accordance with an alternate embodiment of the present invention.

FIG. 4 shows a coated analytic plate 70 which is constructed of a substrate 72 having an upper surface 74, a lower surface 76, a right end 78, and a left end 80, and a hydrophobic developable coating 82 disposed on the upper surface 74 of the substrate 72 near the left end 80 thereof. The material from which the developable coating 82 is made is described above.

Figure 5:
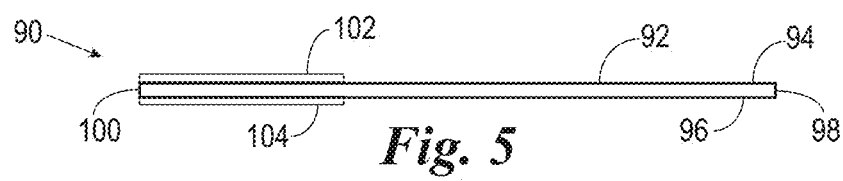
FIG. 5 is a side view of an analytic plate having first and second coatings thereon in accordance with an alternate embodiment of the invention.

FIG. 5 shows a coated analytic plate 90 which is constructed of a substrate 92 having an upper surface 94, a lower surface 96, a right end 98, and a left end 100, and an etchable hydrophobic first coating 102 disposed on the upper surface 94 of the substrate 92 near the left end 100 thereof and a developable second coating 104 disposed on the lower surface 96 of the substrate 92 near the left end 100 thereof and beneath the first coating 102. When an indicium is etched through the first coating 102 light passing through the substrate 92 can develop the exposed portion of the second coating 104 thereby forming a visual representation of the indicium therein.

Figure 6:
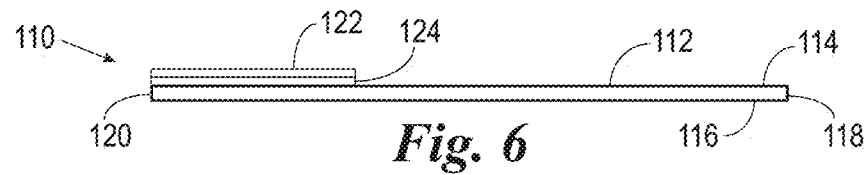
FIG. 6 is a side view of an analytic plate having first and second coatings thereon in accordance with an alternate embodiment of the invention.

FIG. 6 shows a coated analytic plate 110 which is constructed of a substrate 112 having an upper surface 114, a lower surface 116, a right end 118, and left end 120, and a developable lower coating 124 disposed on the upper surface 114 of the substrate 112 near the left end 120 thereof, and a hydrophobic etchable upper coating 122 disposed on the lower coating 124 near the left end 120 of the substrate 112. When an indicium is etched through the upper coating 122 light passing therethrough can develop the exposed portion of the lower coating 124 thereby forming a contrasting visual representation of the indicium therein.

Figure 7:
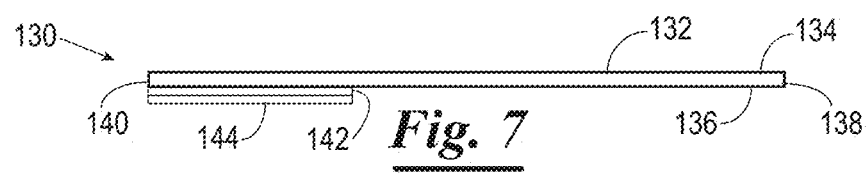
FIG. 7 is a side view of an analytic plate having first and second coatings thereon in accordance with an alternate embodiment of the invention.

FIG. 7 shows a coated analytic plate 130 which is constructed of a substrate 132 having an upper surface 134, a lower surface 136, a right end 138, and a left end 140, and a developable first coating 142 disposed on the lower surface 136 of the substrate 132 near the left end 140 thereof, and an opaque second coating 144 disposed on the first coating 142 near the left end 140 of the substrate 132 and beneath the first coating 142.

Figure 8:
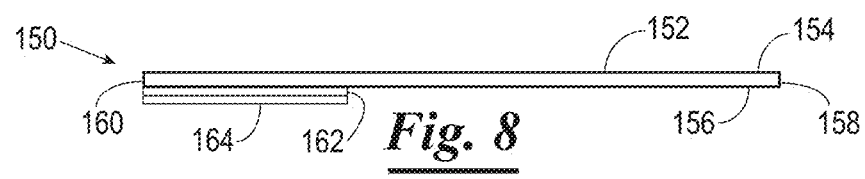
FIG. 8 is a side view of an analytic plate having first and second coatings thereon in accordance with an alternate embodiment of the invention.

FIG. 8 shows a coated analytic plate 150 which is constructed of a substrate 152 having an upper surface 154, a lower surface 156, a right end 158, and a left end 160, and a developable first coating 162 disposed on the lower surface 156 of the substrate 152 near the left end 160 thereof and a transparent or translucent colored second coating 164 disposed on and beneath the first coating 162.

Figure 9:
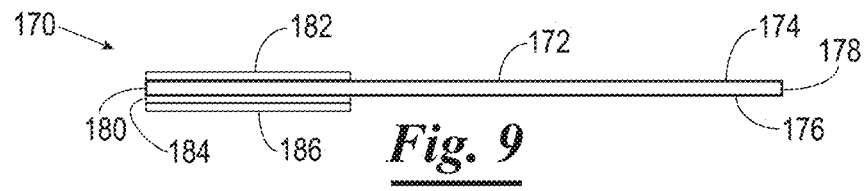
FIG. 9 is a side view of an analytic plate having a first, second, and third coating thereon in accordance with an alternate embodiment of the invention.

FIG. 9 shows a coated analytic plate 170 which is constructed of a substrate 172 having an upper surface 174, a lower surface 176, a right end 178, and a left end 180, and a hydrophobic first coating 182 disposed on the upper surface 174 of the substrate 172 near the left end 180 thereof and a developable second coating 184 disposed on the lower surface 176 of the substrate 172 near the left end 180 thereof, and an opaque third coating 186 disposed underneath the second coating 184.

Figure 10:
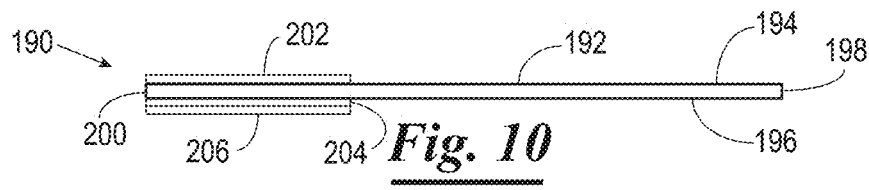
FIG. 10 is a side view of an analytic plate having a first, second, and third coating thereon in accordance with an alternate embodiment of the invention.

FIG. 10 shows a coated analytic plate 190 which is constructed of a substrate 192 having an upper surface 194, a lower surface 196, a right end 198, and a left end 200, and a hydrophobic first coating 202 disposed on the upper surface 194 of the substrate 192 near the left end 200 thereof and a developable second coating 204 disposed on the lower surface 196 of the substrate 192 near the left end 200 thereof and beneath the first coating 202. A transparent or translucent colored third coating 206 is disposed beneath the second coating 204.

Figure 11:
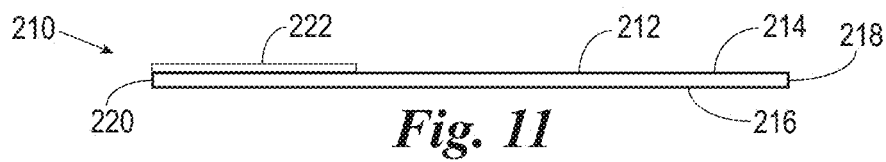
FIG. 11 is a side view of an analytic plate having a coating thereon in accordance with an alternate embodiment of the present invention.

FIG. 11 shows a coated analytic plate 210 which is constructed of a substrate 212 having an upper surface 214, a lower surface 216, a right end 218, and a left end 220, and a coating 222 disposed on the upper surface 214 of the substrate 212 near the left end 220 thereof. The coating 222 may be opaque or transparent and developable and hydrophobic, or coating 222 may be opaque, hydrophobic and non-developable.

Figure 12:
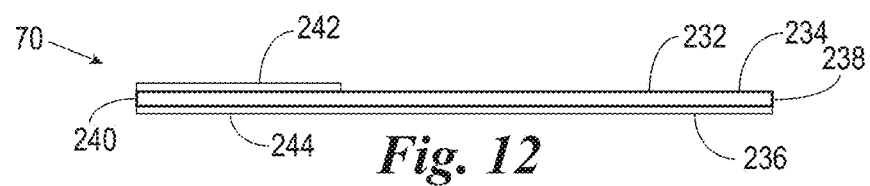
FIG. 12 is a side view of an analytic plate having first and second coatings thereon in accordance with an alternate embodiment of the invention.

FIG. 12 shows a coated analytic plate 230 which is constructed of a substrate 232 having an upper surface 234, a lower surface 236, a right end 238, and a left end 240, and an etchable hydrophobic first coating 242 disposed on the upper surface 234 of the substrate 232 near the left end 240 thereof and a transparent developable second coating 244 disposed on the lower surface 236 of the substrate 232 substantially over the entire lower surface 236.

Figure 13:
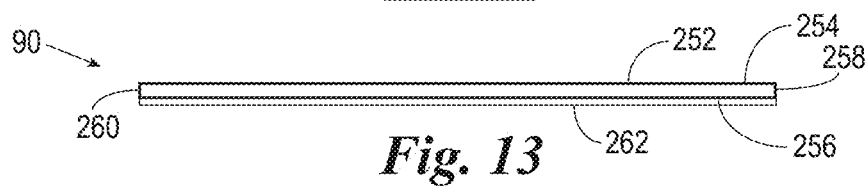
FIG. 13 is a side view of an analytic plate having a coating thereon in accordance with an alternate embodiment of the present invention.

FIG. 13 shows a coated analytic plate 250 which is constructed of a substrate 252 having an upper surface 254, a lower surface 256, a right end 258, and a left end 260, and a transparent developable coating 262 disposed on the lower surface 256 of the substrate 252 substantially over the entire lower surface 256. Substrate 252 preferably also has a marking surface on the upper surface 254 near the left end 260. When the substrate 252 is a coverslip it generally has no marking surface but preferably has an indicium which indicates which side of the substrate 252 has the developable coating 262.

Figure 14:
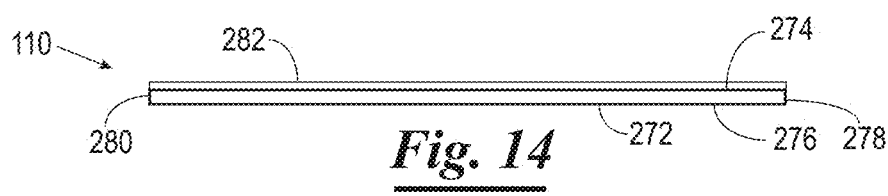
FIG. 14 is a side view of an analytic plate having a coating thereon in accordance with an alternate embodiment of the present invention.

FIG. 14 shows a coated analytic plate 270 which is constructed of a substrate 272 having an upper surface 274, a lower surface 276, a right end 278, and a left end 280, and a transparent developable coating 282 disposed on the upper surface 274 of the substrate 272 substantially over the entire upper surface 256 thereof. Substrate 272 preferably has a marking surface on the upper surface 274 near left end 280.

Figure 15:
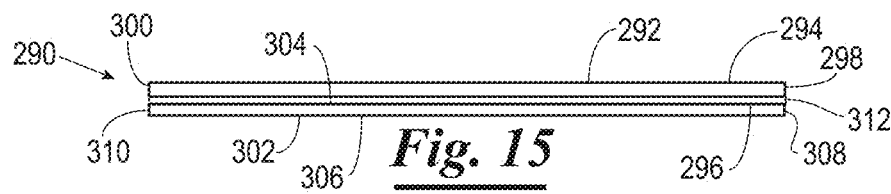
FIG. 15 is a side view of a pair of analytic plates having a coating disposed therebetween.

FIG. 15 shows an analytic plate system 290 which is constructed of a first substrate 292 having an upper surface 294, a lower surface 296, a right end 298, and a left end 300, and a second substrate 302 having an upper surface 304, a lower surface 306, a right end 308 and a left end 310. A transparent developable coating 312 is disposed between the lower surface 296 of first substrate 292 and the upper surface 304 of second substrate 302, wherein the first substrate 292, coating 312, and second substrate 302 are laminated together.

Figure 16:
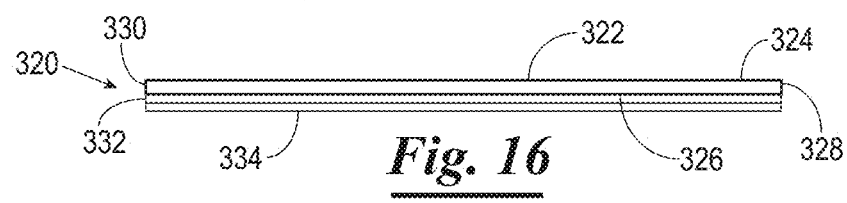
FIG. 16 is a side view of an analytic plate having first and second coatings thereon in accordance with an alternate embodiment of the invention.

FIG. 16 shows a coated analytic plate 320 which is constructed of a substrate 322 having an upper surface 324, a lower surface 326, a right end 328, and a left end 330, and a transparent developable first coating 332 disposed over the lower surface 326 of the substrate 322 substantially over the entire lower surface 326 and a transparent adhesive second coating 334 disposed on the first coating 332 generally substantially covering the entire first coating 332.

FIG. 17 shows a coated analytic plate 340 which is constructed of a substrate 342 having an upper surface 344, a lower surface 346, a right end 348, and a left end 350, and a transparent developable first coating 352 disposed substantially over the upper surface 344 of the substrate 342 and an adhesive second coating 354 disposed on the lower surface 346 of the substrate 342 disposed on the lower surface 346 of the substrate 342 over substantially the entire lower surface 346. The substrate 342 is preferably a coverslip.

FIG. 18 shows a coated analytic plate 360 which is constructed of a substrate 362 having an upper surface 364, a lower surface 366, a right end 368, and a left end 370, and a transparent developable first coating 372 disposed over substantially the entire upper surface 364 of the substrate 362 and a transparent developable second coating 374 disposed over substantially the entire lower surface 366 of the substrate 362, and an adhesive third coating 376 disposed over substantially the entire second coating 374. The substrate 362 is preferably a coverslip.

FIG. 19 shows a coated analytic plate 380 which is constructed of a substrate 382 having an upper surface 384, a lower surface 386, a right end 388, and a left end 390, and a transparent developable first coating 392 disposed on the upper surface 384 of the substrate 382 over substantially the entire upper surface 384 and a transparent developable second coating 394 disposed over substantially the entire surface 386 of the substrate 382. The substrate 382 preferably has a marking surface thereon if it is a microscope slide.

FIG. 20 shows a coated analytic plate 400 which is constructed of a substrate 402 having an upper surface 404, a lower surface 406, a right end 408, and a left end 410, and a first coating 412 disposed on the upper surface 404 of the substrate 402 near the left end 410 thereof and a transparent developable second coating 414 disposed on the lower surface 406 of the substrate 402 over substantially the entire lower surface 406. The first coating may comprise a hydrophobic material, an opaque material, an etchable opaque material or an opaque or colored developable material, any of which may be hydrophobic or non-hydrophobic.

FIG. 21 shows a coated analytic plate 420 which is constructed of a substrate 422 having an upper surface 424, a lower surface 426, a right end 428, and left end 430, and a transparent developable first coating 432 disposed on the upper surface of the substrate 422 over substantially the entire upper surface 424, and a second coating 434 disposed on the first coating 432 near the left end 430 of the substrate 422. The second coating 434 may comprise a hydrophobic material, an opaque material, an etchable opaque material, or an opaque or developable material, any of which may be hydrophobic or non-hydrophobic and may or may not be used for marking.

FIG. 22 shows a coated analytic plate 440 which is constructed of a substrate 442 having an upper surface 444, a lower surface 446, a right end 448, and a left end 450, and a hydrophobic developable first coating 452 disposed on the upper surface 444 of the substrate 442 near the left end 450 thereof and a second coating 454 disposed on the lower surface 446 of the substrate 442 near the left end 450 thereof, and beneath the first coating 452. The second coating may be an opaque, or colored transparent or translucent material.

FIG. 23 shows a coated analytic plate 460 which is constructed of a substrate 462 having an upper surface 464, a lower surface 466, a right end 468, and a left end 470, and a developable first coating 472 disposed on the upper surface 464 of the substrate 462 near the left end 470 thereof, and a hydrophobic second coating 474 disposed on the first coating 472 near the left end 470 of the substrate 462, and an opaque third coating 476 disposed on the lower surface 466 beneath the first coating 472 and second coating 474.

FIG. 24 shows a coated analytic plate 480 which is constructed of a substrate 482 having an upper surface 484, a lower surface 486, a right end 488, and a left end 490, and a developable first coating 492 disposed on the upper surface 484 of the substrate 482 near the left end 490 thereof, and a hydrophobic second coating 494 disposed on the first coating 492 near the left end 490 of the substrate 482 and a transparent or translucent colored third coating 496 disposed on the lower surface 486 and beneath the first coating 492 and second coating 494.

Figure 25:
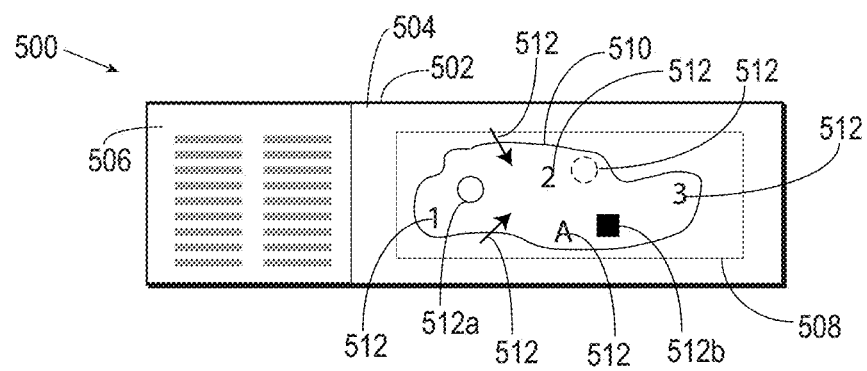
FIG. 25 is a top plan view of an analytic plate having a first and second coating thereon and marked in accordance with the present invention.

FIG. 25 shows an analytic plate 500 comprising a substrate 502 (e.g., a microscope slide) having an upper surface 504 and a markable end 506. The substrate 502 has a transparent developable coating thereon either on the upper surface 504 or the lower surface of the substrate 502, for example as shown in the analytic plates of FIG. 12, 20 or 21. The substrate 502 has a biological sample 510 disposed on the upper surface 504 thereof and is covered by a plate 508 such as a cover slip. The user has marked a variety of indicia 512 in the transparent developable coating which is disposed on the substrate 502. The indicia 512 can be referred to later by the user or a technician to identify specific positions on the biological sample 510. Alternatively the transparent developable coating could be on a surface of the plate 508, as shown for example in the embodiments of FIGS. 16-19. The indicia 512 may be dark, colored, fluorescent, or any other visible markings. Indicium 512a represents a location on the biological sample 510 which has been marked by marking a perimeter. Indicium 512b represents a location on the biological sample 510 which has been dissected away, the "box" portion of the developable coating under the sample having been completely blackened.

Figure 26:
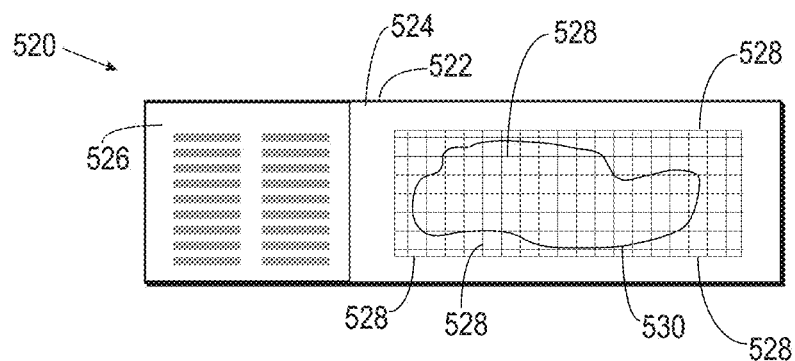
FIG. 26 is a top plan view of an analytic plate having a first and second coating thereon and marked in accordance with the present invention.

FIG. 26 shows an analytic plate 520 comprising a substrate 522 having an upper surface 524 and a markable coating 526 as described elsewhere herein. The substrate 522 has a transparent developable coating thereon, on upper surface 524 or on a lower surface thereof. A photoactivator is used to develop a grid of lines 528 in the developable coating, either before or after a biological sample 530 is applied to the substrate 522.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, compositions of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of marking a microscope slide, comprising:
    obtaining a microscope slide having a first surface, a second surface, and a transparent or invisible developable coating associated with at least one of the first surface and the second surface, the transparent or invisible developable coating being developable by exposure to a photoactivating wavelength or an activating heat;
    positioning a biological sample on the first surface of the microscope slide,
    selecting at least one location on the biological sample; and
    exposing the transparent or invisible developable coating to the photoactivating wavelength or the activating heat to develop a portion of the transparent or invisible developable coating into an indicium at the at least one selected location on the biological sample that identifies the at least one selected location on the biological sample.

2. The method of claim 1, wherein the transparent or invisible developable coating is hydrophobic.

3. The method of claim 1, wherein the exposed portion of the transparent or invisible developable coating becomes darker in comparison to the unexposed portions of the transparent or invisible developable coating.

4. The method of claim 1, wherein the exposed portion of the transparent or invisible developable coating becomes opaque in comparison to the unexposed portions of the transparent or invisible developable coating.

5. The method of claim 1, wherein the exposed portion of the transparent or invisible developable coating becomes a different color in comparison to the unexposed portions of the transparent or invisible developable coating.

6. The method of claim 1, wherein the exposed portion of the transparent or invisible developable coating becomes fluorescent in comparison to the unexposed portions of the transparent or invisible developable coating.

7. The method of claim 1, wherein the indicium represents a perimeter within the biological sample.

8. The method of claim 1, wherein the indicium represents a location on the biological sample which has been removed from the biological sample.

9. The method of claim 1, wherein the exposing step further comprises:
    removing a portion of the biological sample in a way that exposes the transparent or invisible developable coating to the photoactivating wavelength or the activating heat to develop a portion of the transparent or invisible developable coating so the indicum identifies a location of the removed portion.

10. The method of claim 9, wherein the transparent or invisible developable coating is hydrophobic.

11. The method of claim 9, wherein the exposed portion of the transparent or invisible developable coating becomes darker in comparison to the unexposed portions of the transparent or invisible developable coating.

12. The method of claim 9, wherein the exposed portion of the transparent or invisible developable coating becomes opaque in comparison to the unexposed portions of the transparent or invisible developable coating.

13. The method of claim 9, wherein the exposed portion of the transparent or invisible developable coating becomes a different color in comparison to the unexposed portions of the transparent or invisible developable coating.

14. The method of claim 9, wherein the exposed portion of the transparent or invisible developable coating becomes fluorescent in comparison to the unexposed portions of the transparent or invisible developable coating.

* * * * *